(12) United States Patent
Yamada et al.

(10) Patent No.: US 7,969,661 B2
(45) Date of Patent: Jun. 28, 2011

(54) WIDE ANGLE ZOOM LENS AND IMAGE PICKUP DEVICE USING THE SAME

(75) Inventors: Yasuharu Yamada, Sagamihara (JP); Takeshi Hosoya, Machida (JP)

(73) Assignee: Olympus Imaging Corp., Tokyo (JP)

( * ) Notice: Subject to any disclaimer, the term of this patent is extended or adjusted under 35 U.S.C. 154(b) by 18 days.

(21) Appl. No.: 12/657,880

(22) Filed: Jan. 28, 2010

(65) Prior Publication Data
US 2010/0202063 A1 Aug. 12, 2010

(30) Foreign Application Priority Data
Feb. 12, 2009 (JP) ................................ 2009-029562

(51) Int. Cl.
*G02B 15/14* (2006.01)
(52) U.S. Cl. ....................................... 359/682; 359/689
(58) Field of Classification Search .................. 359/676, 359/682, 689
See application file for complete search history.

(56) References Cited

U.S. PATENT DOCUMENTS

| | | | | |
|---|---|---|---|---|
| 4,828,372 A * | 5/1989 | Betensky et al. | ............. | 359/689 |
| 6,515,804 B2 * | 2/2003 | Watanabe et al. | ............. | 359/689 |
| 2003/0072085 A1 * | 4/2003 | Mizuguchi et al. | ........... | 359/680 |

FOREIGN PATENT DOCUMENTS

| | | |
|---|---|---|
| JP | 04-217219 | 8/1992 |
| JP | 06-094996 | 4/1994 |
| JP | 11-052246 | 2/1999 |
| JP | 2005-037727 | 2/2005 |

* cited by examiner

*Primary Examiner* — Darryl J Collins
(74) *Attorney, Agent, or Firm* — Kenyon & Kenyon LLP

(57) ABSTRACT

A wide angle zoom lens, includes, from an object side in the following order: a first lens group that has a negative refractive power; a second lens group that has a positive refractive power; and a third lens group. When variable magnification is carried out from a wide angle end to a telephoto end, the first and second lens groups move while the third lens group remains fixed, so that an air space between the first lens group and the second lens group becomes narrow and that a space between the second lens group and the third lens group becomes wide. The first and second lens groups each include at least one positive lens and one negative lens. The third lens group includes one positive or negative meniscus lens whose convex surface faces an image surface. The following conditional expressions (1) and (2) are satisfied:

$$1.4 \leq |f1|/fw \leq 1.8 \quad (1); \text{ and}$$

$$1.7 \leq f2/fw \leq 2.1 \quad (2)$$

where f1 is a focal length of the first lens group of the wide angle zoom lens; f2 is a focal length of the second lens group of the wide angle zoom lens; and fw is a focal length of the entire system at the wide angle end of the wide angle zoom lens.

15 Claims, 10 Drawing Sheets

First embodiment

First embodiment

Second embodiment

Third embodiment

First embodiment

Second embodiment

Third embodiment

WIDE ANGLE ZOOM LENS AND IMAGE PICKUP DEVICE USING THE SAME

This application claims benefit of Japanese Application No. 2009-029562 filed in Japan on Feb. 12, 2009, the contents of which are incorporated by this reference.

BACKGROUND OF THE INVENTION

The present invention relates to a zoom lens used in an image pickup device and the like and particularly to an interchangeable wide angle zoom lens used in a digital single lens camera and the like.

As for the wide angle zoom lens of digital camera, an optical system having a long back focus is required in order to provide a space into which optical elements such as filters are inserted right in front of an electronic image pickup plane while securing a wide angle of view. As such an optical system, a retro-focus type optical system is widely applied that has a front group of negative refractive power and a rear group of positive refractive power. If a so-called oblique light incidence situation occurs in which an incident optical beam tilts with respect to an optical axis when striking the electronic image pickup plane after passing through the optical system, the amount of peripheral light decreases, and shading and color drift occur. Therefore, an optical system has been proposed to maintain telecentricity of the incident optical beam. Such a type of technology is disclosed in JP-A-4-217219, JP-A-6-94996, JP-A-11-52246, or JP-A-2005-37727.

In recent years, a compact wide angle zoom lens of digital camera is required whose overall length of the lens is made shorter with a high variable magnification ratio. If an optical system has fewer lenses to achieve downsizing, it is difficult to design the optical system that maintains telecentricity while securing a wide angle and suppressing various types of aberration. However, in recent years, technologies have been proposed to correct distortion to some extent by using electric signals as the technologies of electronic image pickup elements advance. Therefore, it is not necessary to pay particular attention to distortion correction in correcting aberration.

SUMMARY OF THE INVENTION

Provided is a compact wide angle zoom lens that corrects distortion to some extent, corrects various kinds of aberration such as chromatic aberration and field curvature appropriately, and secures a long back focus and telecentricity while having a wide angle of view of around 75 degrees at a wide angle end.

A wide angle zoom lens, includes, from an object side in the following order: a first lens group that has a negative refractive power; a second lens group that has a positive refractive power; and a third lens group. When variable magnification is carried out from a wide angle end to a telephoto end, the first and second lens groups move while the third lens group remains fixed, so that an air space between the first lens group and the second lens group becomes narrow and that a space between the second lens group and the third lens group becomes wide. The first and second lens groups each include at least one positive lens and one negative lens. The third lens group includes one positive or negative meniscus lens whose convex surface faces an image surface.

The zoom lens in which the negative first lens group, the positive second lens group, and the third lens group are arranged from the object side in that order has a wider picture-taking angle of view at the wide angle end, and is able to easily secure a longer back focus. Moreover, the number of lens groups that move when the variable magnification is carried out is small: Only the first and second lens groups move. Therefore, a lens frame is simple in structure and can be downsized easily. Furthermore, costs can be easily reduced because of a fewer number of lenses in an optical system compared with typical positive preceding zoom lens.

In addition, the first and second lens groups use a combination of positive and negative lenses to correct various types of aberration such as chromatic aberration. The third lens group uses the meniscus lens whose convex surface faces the image surface to correct chiefly field curvature while reducing the decline in performance caused by eccentricity at the time of manufacturing.

Moreover, the wide angle zoom lens of the present invention is so formed as to satisfy the following conditional expressions (1) and (2):

$$1.4 \leq |f1|/fw \leq 1.8 \quad (1); \text{ and}$$

$$1.7 \leq f2/fw \leq 2.1 \quad (2)$$

where f1 is a focal length of the first lens group of the zoom lens;

f2 is a focal length of the second lens group of the zoom lens;

and fw is a focal length of the entire system at the wide angle end of the zoom lens.

The conditional expression (1) is a rule pertaining to the focal length of the first lens group, standardized by the focal length at the wide angle end. If the number exceeds the upper limit of the conditional expression (1), the negative refractive power of the first lens group declines. Accordingly, while it is easy to correct various types of aberration, the effect of the retro-focus type decreases and it becomes difficult to secure a substantial back focus. If the number goes below the lower limit of the conditional expression (1), the negative refractive power of the first lens group increases, and it becomes difficult to correct various types of aberration.

The conditional expression (2) is a rule pertaining to the focal length of the second lens group, standardized by the focal length at the wide angle end. If the number exceeds the upper limit of the conditional expression (2), the positive refractive power of the second lens group declines and it becomes easy to correct various types of aberration. However, exceeding the upper limit is not preferable from a practical perspective because the amount of movement increases to secure the same ratio of the variable magnification and because the optical system as a whole increases in size. If the number goes below the lower limit of the conditional expression (2), the positive refractive power of the second lens group increases, and it becomes difficult to correct various types of aberration.

Furthermore, the present invention described above preferably includes one of the following structures.

In the wide angle zoom lens of the present invention, the third lens group preferably includes one positive meniscus lens whose convex surface faces an image surface and which has a weak positive refractive power.

Thanks to the above configuration, while correcting field curvature and the like, it is possible to move the position of an exit pupil away from the image surface. Therefore, it becomes easier to secure a telecentric optical system and is advantageous to shading.

Moreover, in the wide angle zoom lens of the present invention, only the first lens group preferably moves to the object side during focusing from a long distance object point to a short distance object point.

Since the first lens group is moved to the object side during focusing from the long distance object point to the short distance object point, the change in field curvature or the like can be kept as low as possible. Therefore, it is easy to secure a high optical performance from the long distance object point to the short distance object point. Moreover, the configuration is formed by a simple frame structure and can therefore be realized by a small and low-cost mechanism.

At the image side of the second lens group, there are two positive lenses, and the following conditional expression (3) is preferably satisfied:

$$1.5 \leq f_{2rp}/fw \leq 2.0 \quad (3)$$

where $f_{2rp}$ is a total focal length of the two positive lenses that are disposed at the image side of the second lens group.

The conditional expression (3) is a rule pertaining to the total focal length of the two positive lenses that are disposed at the image side of the second lens group, standardized by the focal length at the wide angle end. If the number exceeds the upper limit of the conditional expression (3), the positive refractive power of the two positive lenses that are disposed at the image side of the second lens group declines. Accordingly, the angle of emergence of an optical beam around a screen increases at the wide angle end, and it becomes difficult to secure telecentricity. If the number goes below the lower limit of the conditional expression (3), the positive refractive power of the two positive lenses that are disposed at the image side of the second lens group increases. Therefore, field curvature occurs on a large scale at the minus side, and it becomes difficult to make correction.

Moreover, in the wide angle zoom lens of the present invention, the second lens group, from the object side in the following order, includes a positive lens that has a convex surface facing the object; an aperture diaphragm; a cemented lens that has a negative refractive power and is made of a biconvex lens and a biconcave lens combined; a positive lens; and a positive lens. All the lens surfaces of the second lens group are preferably spherical.

The second lens group contributes most to carrying out the variable magnification. Therefore, the second lens group has a large refractive power and is likely to cause aberration because the components vary with the manufacturing process. The use of aspheric lens is advantageous in correcting aberration. However, if a plastic aspheric lens is used, the problem is that aberration changes as temperature and humidity change. If a glass aspheric lens is used, the problem is that the lens radius increases as the image pickup element increases in size, leading to an increase in costs. Therefore, the above configuration is formed by only the glass spherical lenses. It is possible to have a stable optical performance during the manufacturing process, easily correct various types of aberration with a fewer number of lenses, and secure a low-cost, high optical performance.

Moreover, in the wide angle zoom lens of the present invention, the first lens group preferably includes at least one aspheric surface.

Thanks to the above configuration, it becomes easier to correct field curvature and barrel-shaped distortion, which are likely to occur when the retro-focus type optical system is downsized at the wide angle end. Therefore, the system can be small in size and secure a high optical performance.

Moreover, in the wide angle zoom lens of the present invention, the first lens group includes a plastic aspheric lens, and the following conditional expression (4) is preferably satisfied:

$$|\phi 12| \leq 0.04 \quad (4)$$

where $\phi 12$ is the refractive power of the plastic aspheric lens.

The conditional expression (4) is a rule governing the refractive power of the plastic aspheric lens in the first lens group.

In general, the plastic aspheric lens is inexpensive. However, one of the problems is that the performance is likely to vary depending on environmental changes. Since the conditional expression (4) is satisfied, the impact of temperature and humidity changes on the performance decline can be reduced. Therefore, a high optical performance can be secured.

It is more preferable that:

$$|\phi 12| \leq 0.02 \quad (4)'$$

Moreover, in the wide angle zoom lens of the present invention, the first lens group preferably includes a hybrid aspheric lens produced by applying a thin resin layer to the surface of a glass lens and transforming the surface thereof into a aspheric surface.

In general, the hybrid aspheric lens is inexpensive. Since the resin layer is thin, the change in performance rarely occurs even as environment changes. Therefore, it is possible to secure a high optical performance.

Moreover, in the wide angle zoom lens of the present invention, the first lens group preferably includes a glass-molded aspheric lens.

In general, the glass-molded aspheric lens has a higher refractive index than the plastic, and there is a relatively high degree of flexibility in the aspheric shape such as eccentricity ratio of wall thickness. Therefore, it is possible to reduce the number of lenses and secure a high optical performance.

Moreover, in the wide angle zoom lens of the present invention, at least one of the surfaces of the meniscus lens whose convex surface faces the image surface of the third lens group preferably has an aspheric shape whose refractive power gradually decreases away from an optical axis.

Thanks to the above configuration, it becomes easier to correct field curvature and barrel-shaped distortion, which are likely to occur when the retro-focus type optical system is downsized at the wide angle end. Therefore, the system can be small in size and secure a high optical performance.

Moreover, in the wide angle zoom lens of the present invention, the following conditional expression (5) is preferably satisfied:

$$20 \leq |(L31f+L31r)/(L31f-L31r)| \leq 50 \quad (5)$$

where L31f is the curvature radius of the object-side lens surface of the meniscus lens; and L31r is the curvature radius of the image-side lens surface of the meniscus lens.

The conditional expression (5) is an expression governing the shape of the meniscus lens that constitutes the third lens group. If the number exceeds the upper limit of the conditional expression (5), field curvature occurs on a large scale at the plus side, and it becomes difficult to make correction. If the number goes below the lower limit of the conditional expression (5), field curvature occurs on a large scale at the minus side, and it becomes difficult to make correction.

Moreover, in the wide angle zoom lens of the present invention, the following conditional expression (6) is preferably satisfied:

$$0.8 \leq D_{f2-3}/ft \leq 1.2 \quad (6)$$

where $D_{f2-3}$ is an air space on an optical axis at the telephoto end between the lens surface that is closest to the image in the second lens group and the lens surface that is closest to the object in the third lens group; and ft is a focal length of the entire system at the telephoto end of the wide angle zoom lens.

The conditional expression (6) is to govern the ratio of the air space on the optical axis at the telephoto end between the lens surface that is closest to the image in the second lens group and the lens surface that is closest to the object in the third lens group to the focal length of the entire system at the telephoto end of the zoom lens. If the number exceeds the upper limit of the conditional expression (6), the air space between the second lens group and the third lens group becomes longer with respect to the focal length of the entire system at the telephoto end. Therefore, the overall length of the lens becomes longer at the telephoto end when a picture is taken. The longer length is a disadvantage in downsizing. If the number goes below the lower limit of the conditional expression (6), the air space between the second lens group and the third lens group becomes shorter with respect to the focal length of the entire system at the telephoto end. Therefore, the overall length of the lens becomes shorter at the telephoto end when a picture is taken. The shorter length is an advantage in downsizing. However, the distance that the second lens group travels when the variable magnification is carried out from the wide angle end to the telephoto end decreases. The positive refractive power of the second lens group becomes too strong in order to secure the same ratio of the variable magnification, and it becomes difficult to correct various types of aberration.

Moreover, in the wide angle zoom lens of the present invention, the following conditional expression (7) is preferably satisfied:

$$1.0 \leq (SD1+SD2+SD3)/fw \leq 2.8 \quad (7)$$

where SD1 is the distance between the surface that is closest to the object and the surface that is closest to the image among the first lens group on an optical axis;

SD2 is the distance between the surface that is closest to the object and the surface that is closest to the image among the second lens group on an optical axis; and SD3 is the distance between the surface that is closest to the object and the surface that is closest to the image among the third lens group on an optical axis.

The conditional expression (7) is the one that has standardized the sum of distances on an optical axis of the first to third lens groups by the focal length at the wide angle end. If the number exceeds the upper limit of the conditional expression (7), the first to third lens groups increase in thickness on the optical axis. Exceeding the upper limit is not desirable in terms of portability because in a non-picture-taking state, when the overall length of the zoom lens becomes shorter (so-called retracted state) after every lens group moves toward the image from where the lens groups are positioned in a picture-taking state between the wide angle end and the telephoto end, the overall length of the zoom lens entire system becomes larger when being retracted. If the number goes below the lower limit of the conditional expression (7), the first to third lens groups decrease in thickness on the optical axis, and it becomes difficult to secure an enough number of lenses to correct aberration in each of the lens groups.

Moreover, an image pickup device on which the wide angle zoom lens of the present invention is mounted preferably includes a driving means for moving the first, second, and third lens groups that constitute the zoom lens in the direction of the optical axis; and an image pickup element provided near an imaging plane of the optical system. At least one of the first, second, and third groups of the zoom lens preferably can move toward the image pickup element along the optical axis rather than toward the position of the picture-taking state between the wide angle end and the telephoto end, and stops closer to the image pickup element than to the position of the picture-taking state between the wide angle end and the telephoto end in the non-picture-taking state.

According to the present invention, the adjustment of variable magnification of the zoom lens is performed by a mechanical correction method in which the first and second lens groups move in the direction of the optical axis. Even in the picture-taking state, the overall length of each lens group is kept as short as possible. In the non-picture-taking state, the first and second lens group move closer to the image pickup element than to the positions of the picture-taking state between the wide angle end and the telephoto end with the help of the zooming mechanism, thereby making it possible to further reduce the overall length (so-called retracted state).

Moreover, in the image pickup device on which the wide angle zoom lens of the present invention is mounted, the following is preferable: A space is provided in advance between the lens surface that is closest to the image in the third lens group and the image pickup element so that in the non-picture-taking state, the first, second, and third lens groups that constitute the zoom lens can move toward the image pickup element along the optical axis rather than toward the position of the picture-taking state between the wide angle end and the telephoto end, and a control area is secured at the side of the image pickup element even when the entire lens frame is retracted.

If the space at the side of the image pickup element is designed to be as narrow as possible, the overall length of the zoom lens entire system is reduced, the radius of the lens that is closest to the image increases, and the exit pupil comes closer to the image surface, posing a negative impact on shading.

Therefore, according to the zoom lens of the present invention, in the picture-taking state, the exit pupil is substantially separated from the image surface to secure telecentricity even though the overall length becomes longer to a certain extent. A large space is provided in advance between the lens that is closest to the image and the image pickup element so that in the non-picture-taking state, the lens groups do not interfere with lowpass filters and the like that are positioned in front of the image pickup element even when each lens group is moved toward the image. Therefore, the image pickup device can be small in size when a picture is not taken, and at the same time, the optical performance is ensured when a picture is taken.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

DESCRIPTION OF EXEMPLARY EMBODIMENTS

First to third embodiments of the present invention of wide angle zoom lens will be described.

Figure 1:
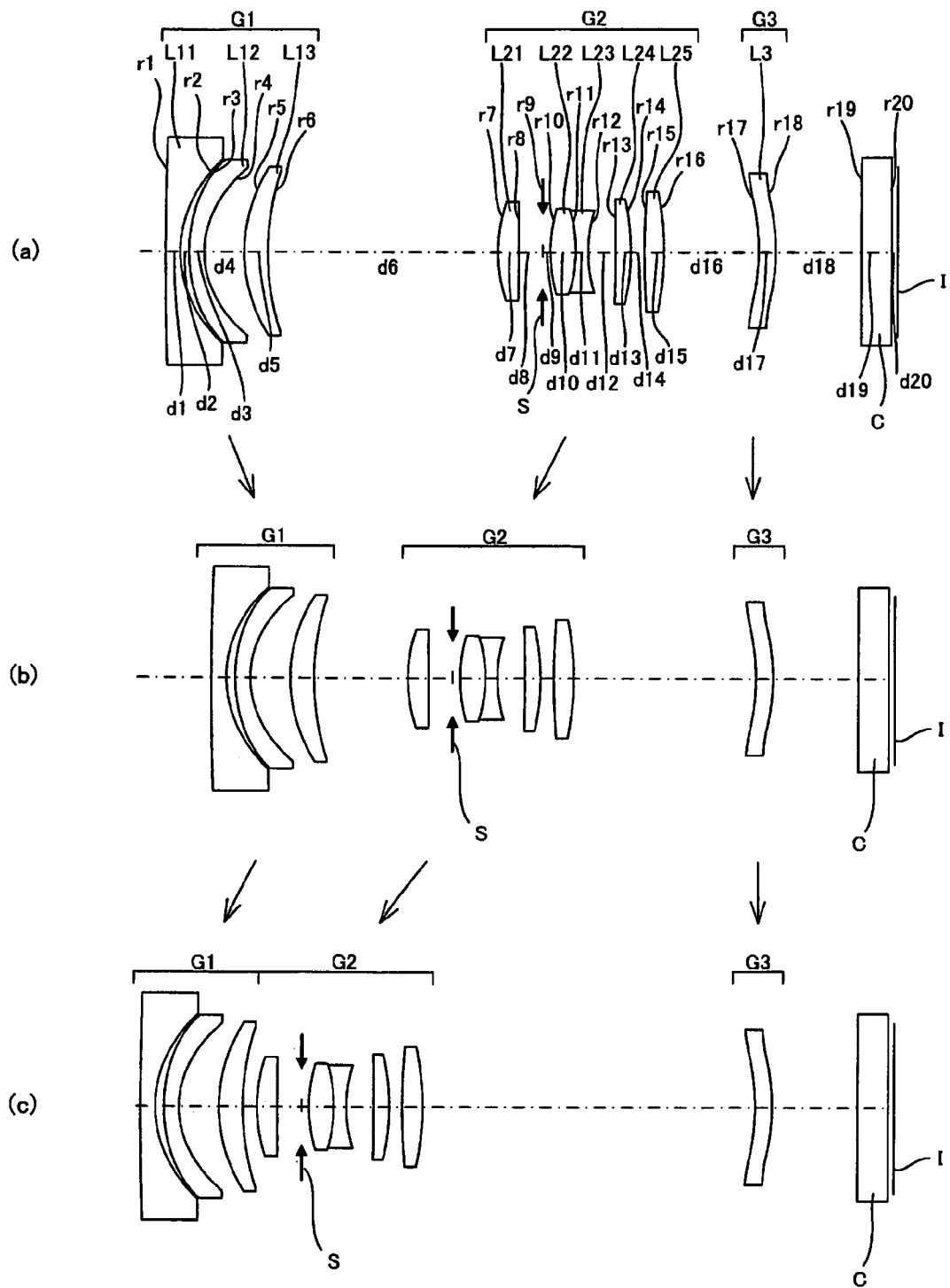
FIG. 1 is a cross-section view of an optical system according to a first embodiment of the present invention.

FIG. 1 is a cross-section view of a wide angle zoom lens according to a first embodiment of the present invention.

As shown in FIG. 1, the wide angle zoom lens of the first embodiment includes, from an object side in the following order, a first lens group G1 having a negative refractive power, a second lens group G2 having a positive refractive power, and a third lens group G3.

The first lens group G1 includes, from the object side in the following order, a negative meniscus lens L11 having a convex surface facing the object, a negative meniscus lens L12 having a convex surface facing the object, and a positive meniscus lens L13 having a convex surface facing the object.

The second lens group G2 includes, from the object side in the following order, a plano-convex positive lens L21 having a convex surface facing the object, an aperture diaphragm S, a cemented lens having a biconvex positive lens L22 and a biconcave negative lens L23, a positive meniscus lens L24 having a convex surface facing an image, and a biconvex positive lens L25.

The third lens group G3 has one positive meniscus lens L3 having a convex surface facing the image.

The reference mark C represents a cover glass, and the reference mark I represents an image surface.

Aspheric surfaces are used for the following four surfaces: both surfaces of the negative meniscus lens L12 at the image side of the first lens group G1, and both surfaces of the positive meniscus lens L3 of the third lens group G3.

Figure 2:
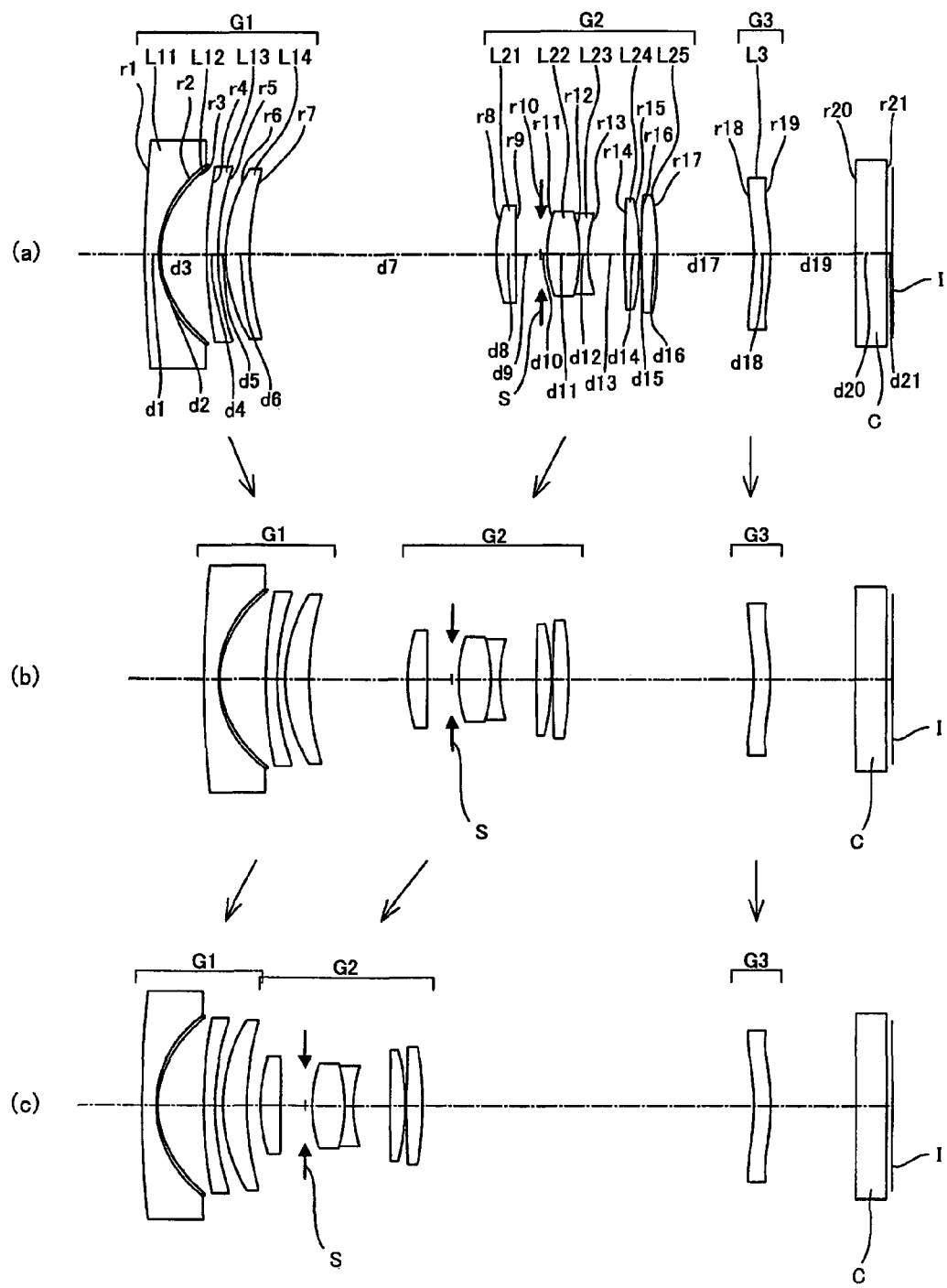
FIG. 2 is a cross-section view of an optical system according to a second embodiment of the present invention.

FIG. 2 is a cross-section view of a wide angle zoom lens according to a second embodiment of the present invention.

As shown in FIG. 2, the wide angle zoom lens of the second embodiment includes, from an object side in the following order, a first lens group G1 having a negative refractive power, a second lens group G2 having a positive refractive power, and a third lens group G3.

The first lens group G1 includes, from the object side in the following order, a cemented lens including a negative meniscus lens L11 having a convex surface facing the object and a negative meniscus lens L12 having a convex surface facing the object, a negative meniscus lens L13 having a convex surface facing the object, and a positive meniscus lens L14 having a convex surface facing the object.

The second lens group G2 includes, from the object side in the following order, a plano-convex positive lens L21 having a convex surface facing the object, an aperture diaphragm S, a cemented lens having a biconvex positive lens L22 and a biconcave negative lens L23, a biconvex positive lens L24, and a biconvex positive lens L25.

The third lens group G3 has one positive meniscus lens L3 having a convex surface facing the image.

The reference mark C represents a cover glass, and the reference mark I represents an image surface.

Aspheric surfaces are used for the following three surfaces: the surface that is closest to the image in the cemented lens of the first lens group G1, and both surfaces of the positive meniscus lens L3 of the third lens group G3.

Figure 3:
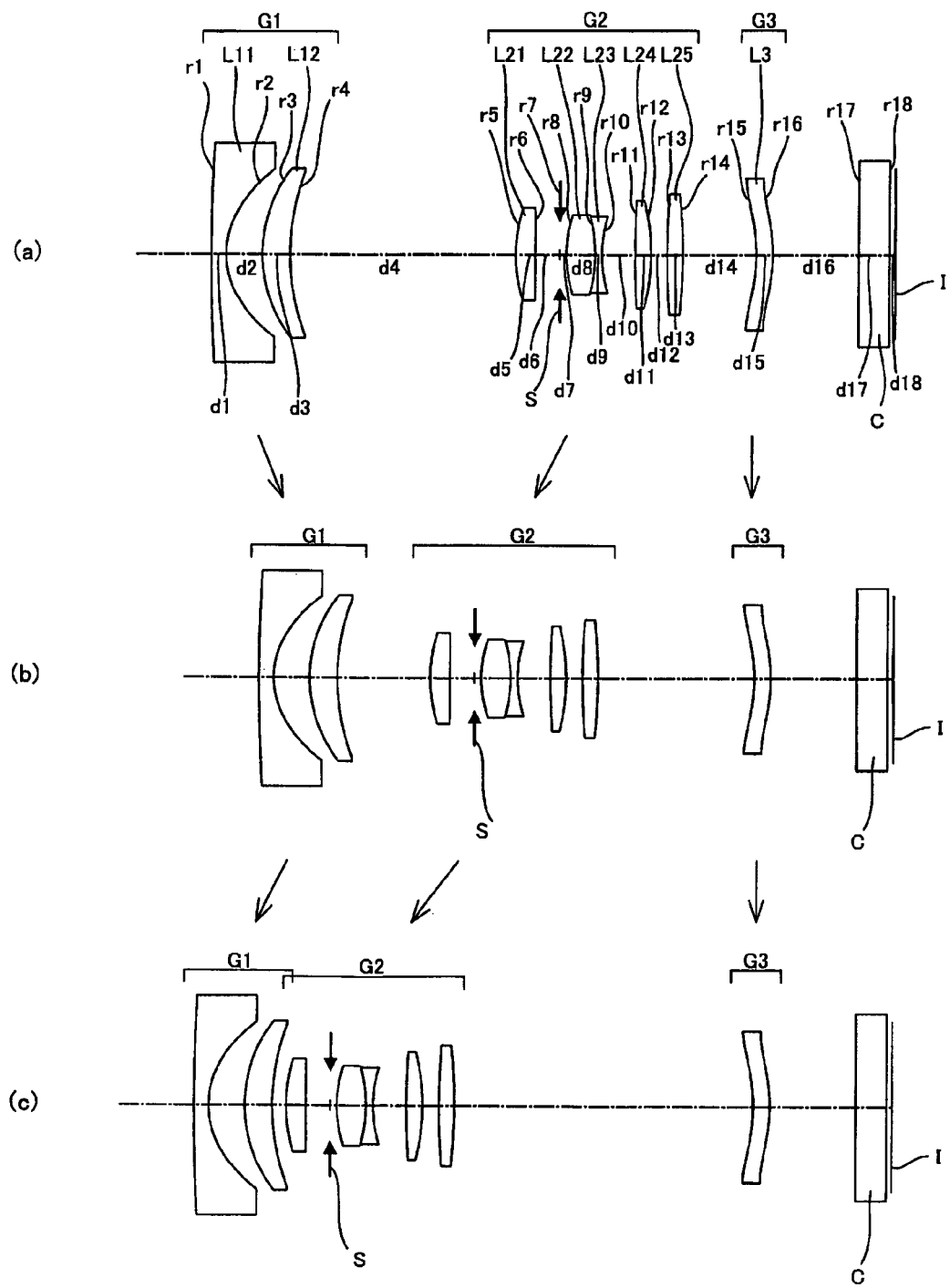
FIG. 3 is a cross-section view of an optical system according to a third embodiment of the present invention.

FIG. 3 is a cross-section view of a wide angle zoom lens according to a third embodiment of the present invention.

As shown in FIG. 3, the wide angle zoom lens of the third embodiment includes, from an object side in the following order, a first lens group G1 having a negative refractive power, a second lens group G2 having a positive refractive power, and a third lens group G3.

The first lens group G1 includes, from the object side in the following order, a negative meniscus lens L11 having a convex surface facing the object and a positive meniscus lens L12 having a convex surface facing the object.

The second lens group G2 includes, from the object side in the following order, a plano-convex positive lens L21 having a convex surface facing the object, an aperture diaphragm S, a cemented lens having a biconvex positive lens L22 and a biconcave negative lens L23, a biconvex positive lens L24, and a biconvex positive lens L25.

The third lens group G3 has one positive meniscus lens L3 having a convex surface facing the image.

The reference mark C represents a cover glass, and the reference mark I represents an image surface.

Aspheric surfaces are used for the following three surfaces: the surface that is close to the image in the negative meniscus lens L11 of the first lens group G1, and both surfaces of the positive meniscus lens L3 of the third lens group G3.

Numeric data of the first to third embodiments will be shown below. As to the numeric data of the first to third embodiments, r represents curvature radius of the lens surface; d represents lens thickness and an air space; Nd and vd represent a refractive index and Abbe number of the d-line ($\lambda = 587.6$ nm); f represents a focal length; Fno represents the F number; $\omega$ represents a half angle of view (degree).

On the specification list related to the description of the embodiments, the surfaces indicated by "aspheric surface" are aspheric surfaces. If the height perpendicular to an optical axis is represented by H, the amount of change in the direction of the optical axis as to the height H when the face top is the origin is represented by X(H), paraxial curvature radius is represented by r, the constant of the cone is represented by K, and the second-order, fourth-order, sixth-order, eighth-order, and tenth-order aspheric surface coefficients are represented by A2, A4, A6, A8, and A10, respectively, the shape of aspheric surface is represented by the following equation (a):

$$X(H) = (H^2/r)/\{1 + [1-(1+K)\cdot(H^2/r^2)]^{1/2}\} + A4H^4 + A6H^6 + A8H^8 + A10H^{10} \quad \text{(a)}$$

Numeric Example 1

Unit mm

Surface data

| Surface Number | r | d | nd | νd |
| --- | --- | --- | --- | --- |
| 1 | 622.057 | 1.950 | 1.77250 | 49.60 |
| 2 | 16.257 | 1.163 | | |
| 3 (Aspheric) | 24.068 | 2.000 | 1.52542 | 55.78 |
| 4 (Aspheric) | 13.129 | 5.260 | | |
| 5 | 20.929 | 3.122 | 1.84666 | 23.78 |
| 6 | 35.453 | variable | | |
| 7 | 21.231 | 2.719 | 1.83481 | 42.71 |
| 8 | ∞ | 3.245 | | |
| 9 (Stop) | ∞ | 0.900 | | |
| 10 | 19.264 | 3.390 | 1.49700 | 81.54 |
| 11 | −19.264 | 1.615 | 1.90366 | 31.32 |
| 12 | 19.264 | 3.564 | | |
| 13 | −357.683 | 2.113 | 1.70154 | 41.24 |
| 14 | −29.309 | 1.672 | | |
| 15 | 88.348 | 2.652 | 1.51823 | 58.90 |
| 16 | −41.868 | variable | | |
| 17 (Aspheric) | −25.613 | 2.200 | 1.52542 | 55.78 |
| 18 (Aspheric) | −23.984 | 11.300 | | |
| 19 | ∞ | 4.082 | 1.51633 | 64.14 |
| 20 | ∞ | 0.745 | | |
| Image Surface | | ∞ | | |

Aspheric data

3rd surface $K = 2.0761, A4 = 9.4881E{-}05, A6 = -1.0061E{-}06, A8 = 5.5441E{-}09, A10 = -1.5976E{-}11$ 4th surface $K = 0.0000, A4 = 6.6885E{-}05, A6 = -1.3641E{-}06, A8 = 7.5439E{-}09, A10 = -3.0175E{-}11$ 17th surface $K = -3.3181, A4 = 5.1432E{-}05, A6 = -6.3896E{-}08, A8 = -1.7711E{-}10$ 18th surface $K = -1.9200, A4 = 8.7907E{-}05, A6 = -8.3092E{-}08, A8 = -1.11376E{-}10, A10 = 2.4384E{-}13$

Zooming data

| | wide angle | intermediate | telescopic |
| --- | --- | --- | --- |
| focal length | 14.29 | 24.24 | 41.19 |
| F number | 3.63 | 4.48 | 5.76 |
| half angle of view(°) | 41.6 | 25.1 | 14.9 |
| image height | 11.45 | 11.45 | 11.45 |
| d6 | 30.536 | 12.468 | 1.810 |
| d16 | 12.365 | 24.006 | 43.987 |
| BF | 16.13 | 16.13 | 16.13 |
| lens total length | 96.59 | 90.17 | 99.49 |

Zoom lens group data

| group | starting surface | focal length |
| --- | --- | --- |
| 1 | 1 | −23.16 |
| 2 | 7 | 27.14 |
| 3 | 17 | 489.93 |

Numeric Example 2

Unit mm

Surface data

| Surface Number | r | d | nd | νd |
| --- | --- | --- | --- | --- |
| 1 | 146.182 | 1.950 | 1.77250 | 49.60 |
| 2 | 14.997 | 0.200 | 1.51940 | 51.94 |
| 3 (Aspheric) | 12.346 | 6.068 | | |
| 4 | 63.423 | 1.500 | 1.69680 | 55.53 |
| 5 | 36.384 | 1.051 | | |
| 6 | 22.408 | 3.147 | 1.84666 | 23.78 |
| 7 | 40.445 | variable | | |
| 8 | 22.598 | 2.635 | 1.83481 | 42.71 |
| 9 | ∞ | 3.257 | | |
| 10 (Stop) | ∞ | 0.900 | | |
| 11 | 18.271 | 4.300 | 1.49700 | 81.54 |
| 12 | −20.672 | 1.147 | 1.90366 | 31.32 |
| 13 | 18.683 | 4.903 | | |
| 14 | 253.605 | 1.966 | 1.69680 | 55.53 |
| 15 | −32.861 | 0.199 | | |
| 16 | 150.067 | 2.122 | 1.58144 | 40.75 |
| 17 | −51.731 | variable | | |
| 18 (Aspheric) | −28.645 | 2.200 | 1.52542 | 55.78 |
| 19 (Aspheric) | −26.458 | 11.300 | | |
| 20 | ∞ | 4.082 | 1.51633 | 64.14 |
| 21 | ∞ | 0.745 | | |
| Image Surface | | ∞ | | |

Aspheric data

3rd surface $K = -0.4661, A4 = -1.1971E{-}05, A6 = -8.1617E{-}08, A8 = 2.2803E{-}10, A10 = -1.8905E{-}12$ 18th surface $K = -6.7655, A4 = 6.2372E{-}05, A6 = 2.9966E{-}07, A8 = -1.9333E{-}09$ 19th surface $K = -4.9999, A4 = 8.7669E{-}05, A6 = 3.2082E{-}07, A8 = -1.5923E{-}09, A10 = -6.2892E{-}13$

Zooming data

| | wide angle | intermediate | telescopic |
| --- | --- | --- | --- |
| focal length | 14.24 | 24.42 | 41.25 |
| F number | 3.64 | 4.49 | 5.77 |
| half angle of view(°) | 41.6 | 25.0 | 14.9 |
| image height | 11.45 | 11.45 | 11.45 |
| d7 | 32.663 | 13.035 | 1.832 |
| d17 | 12.807 | 24.506 | 43.973 |
| BF | 16.13 | 16.13 | 16.13 |
| lens total length | 99.14 | 91.21 | 99.48 |

Zoom lens group data

| group | starting surface | focal length |
| --- | --- | --- |
| 1 | 1 | −24.24 |
| 2 | 8 | 27.78 |
| 3 | 18 | 489.93 |

Numeric Example 3

Unit mm

Surface data

| Surface Number | r | d | nd | vd |
|---|---|---|---|---|
| 1 | 270.688 | 1.951 | 1.77250 | 49.60 |
| 2 (Aspheric) | 11.214 | 4.795 | | |
| 3 | 18.737 | 3.672 | 1.84666 | 23.78 |
| 4 | 31.007 | variable | | |
| 5 | 21.110 | 2.618 | 1.83481 | 42.71 |
| 6 | ∞ | 3.246 | | |
| 7 (Stop) | ∞ | 0.900 | | |
| 8 | 17.073 | 3.840 | 1.49700 | 81.54 |
| 9 | −19.664 | 0.907 | 1.90366 | 31.32 |
| 10 | 17.527 | 4.416 | | |
| 11 | 120.767 | 2.100 | 1.69680 | 55.53 |
| 12 | −29.574 | 2.145 | | |
| 13 | 101.163 | 2.059 | 1.62004 | 36.26 |
| 14 | −79.934 | variable | | |
| 15 (Aspheric) | −23.233 | 2.200 | 1.58313 | 59.38 |
| 16 (Aspheric) | −22.235 | 11.300 | | |
| 17 | ∞ | 4.082 | 1.51633 | 64.14 |
| 18 | ∞ | 0.745 | | |
| Image Surface | ∞ | | | |

Aspheric data

2nd surface $K = -0.4735, A4 = -8.1098E-06, A6 = -7.8008E-08, A8 = 3.0281E-10, A10 = -3.2616E-12$ 15th surface $K = -0.5651, A4 = 3.9089E-05, A6 = 6.4383E-07, A8 = -1.9877E-09$ 16th surface $K = 0.0398, A4 = 6.9134E-05, A6 = 5.3315E-07, A8 = -6.7037E-10, A10 = -1.1823E-12$ Zooming data

| | wide angle | intermediate | telescopic |
|---|---|---|---|
| focal length | 14.28 | 24.25 | 41.22 |
| F number | 3.64 | 4.49 | 5.77 |
| half angle of view(°) | 41.6 | 25.2 | 14.9 |
| image height | 11.45 | 11.45 | 11.45 |
| d4 | 29.769 | 12.196 | 1.834 |
| d14 | 9.781 | 20.766 | 39.603 |
| BF | 16.13 | 16.13 | 16.13 |
| lens total length | 90.52 | 83.94 | 92.41 |

Zoom lens group data

| group | starting surface | focal length |
|---|---|---|
| 1 | 1 | −23.42 |
| 2 | 5 | 25.95 |
| 3 | 15 | 489.88 |

Figure 4:
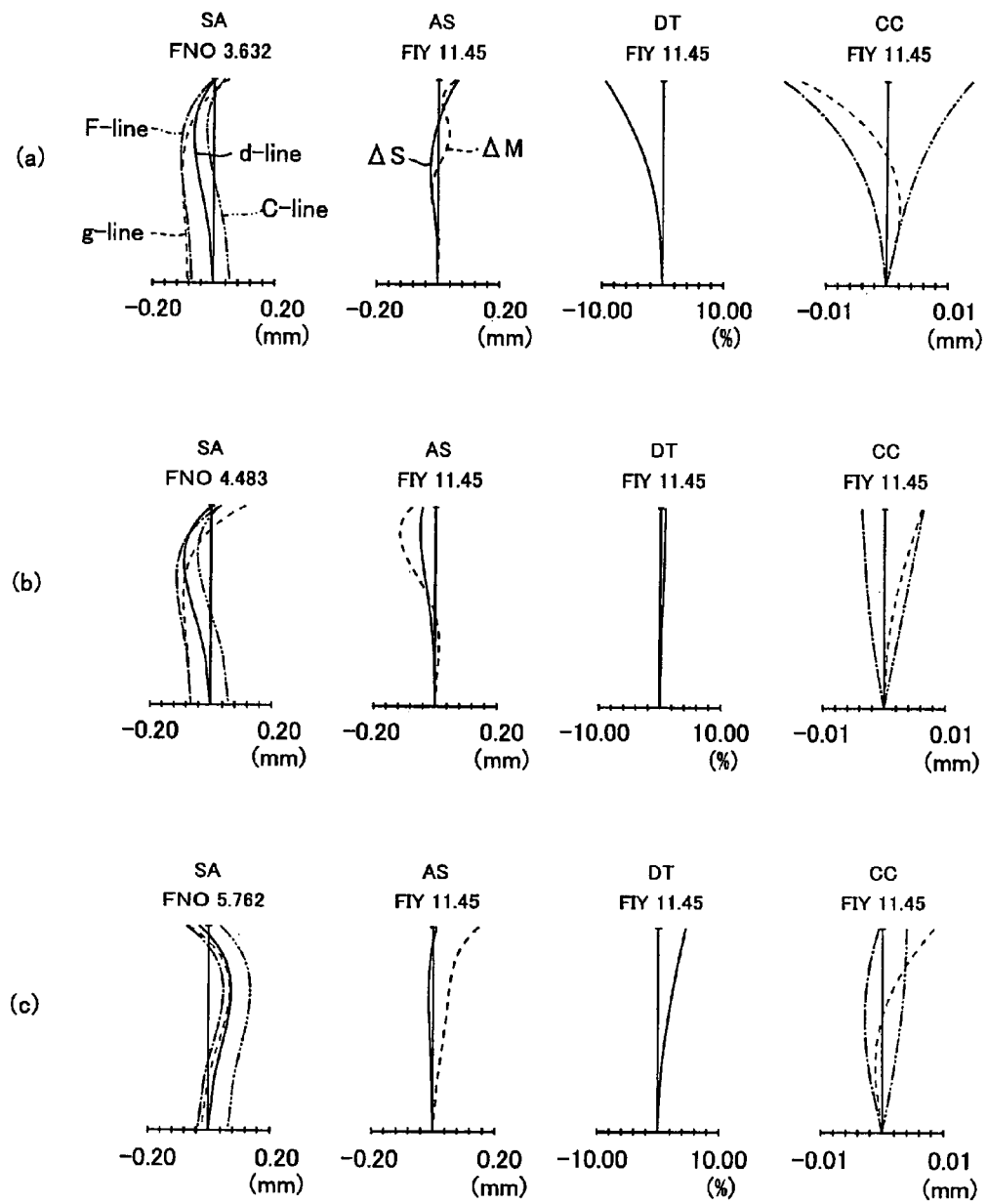
FIGS. 4A to 4C are diagrams illustrating various types of aberration in an infinite-distance focusing state of the optical system according to the first embodiment.
Figure 5:
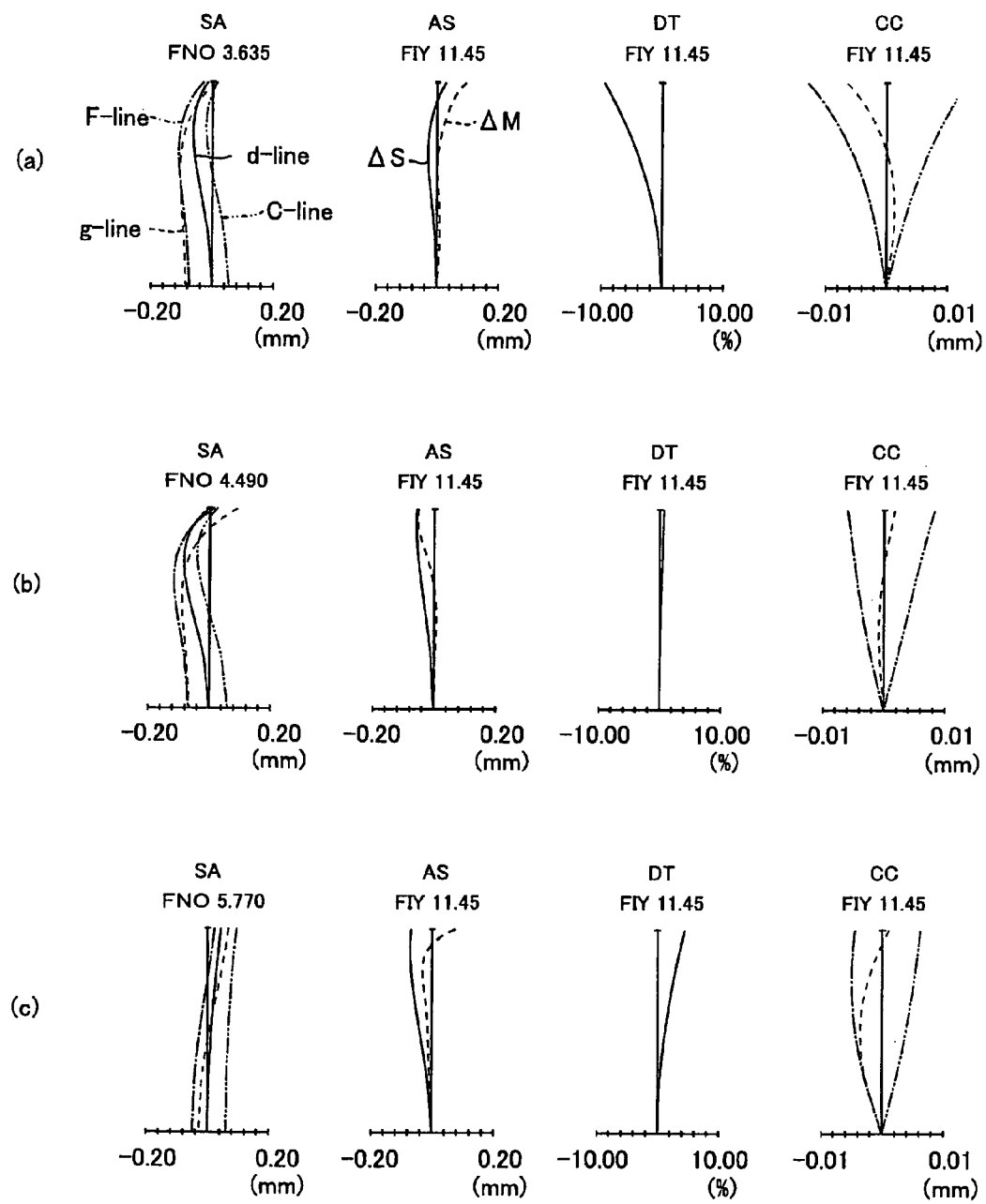
FIGS. 5A to 5C are diagrams illustrating various types of aberration in an infinite-distance focusing state of the optical system according to the second embodiment of the present invention.
Figure 6:
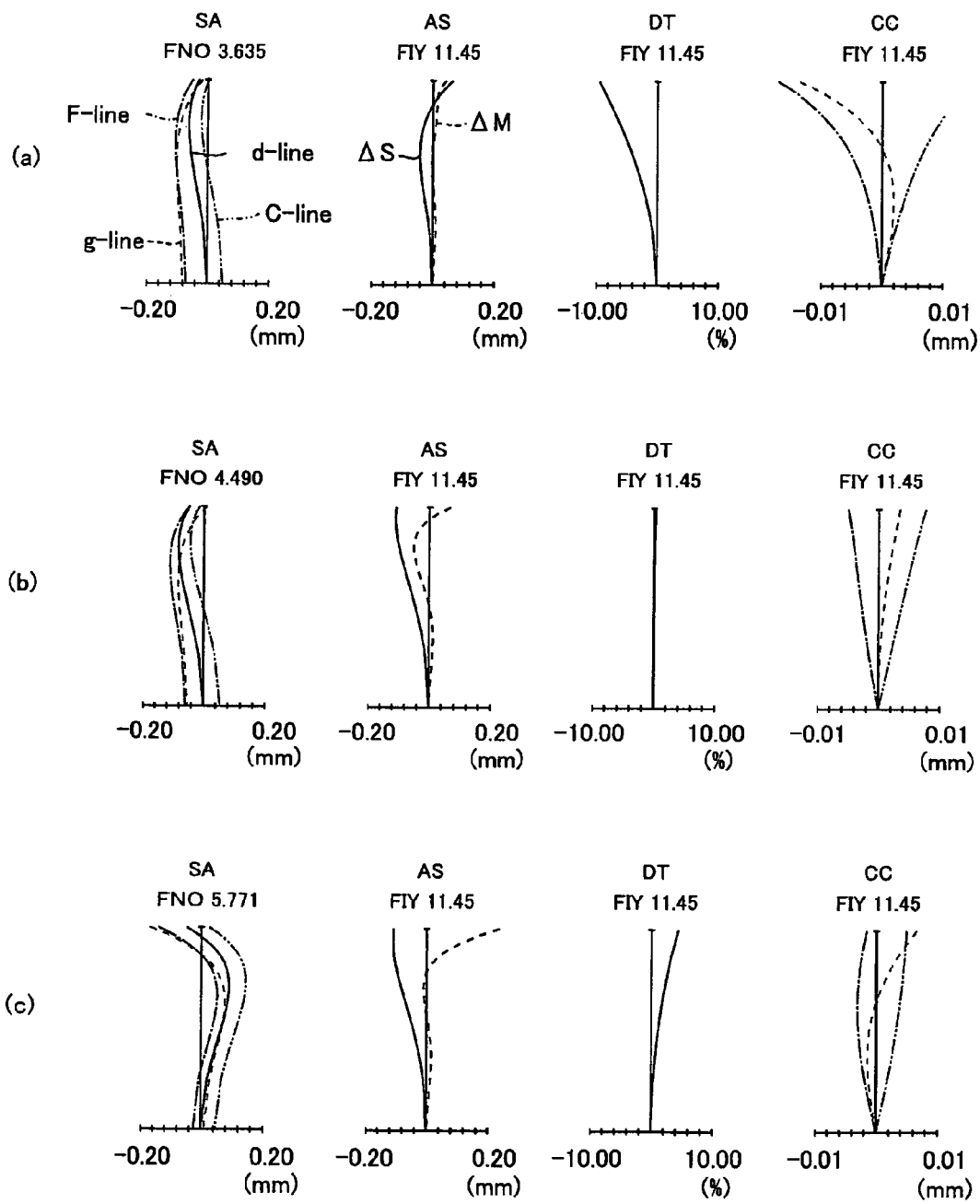
FIGS. 6A to 6C are diagrams illustrating various types of aberration in an infinite-distance focusing state of the optical system according to the third embodiment of the present invention.

FIGS. 4 to 6 are diagrams illustrating various types of aberration in an infinite-distance focusing state of the wide angle end (W_INF), intermediate state (S_INF), and telephoto end (T_INF) of the optical systems of the first to third embodiments. As for spherical aberration and chromatic aberration of magnification, numbers are shown at each of the following wavelengths: 587.6 nm (d-line: Solid lines), 435.8 nm (g-line: Dotted lines), 486.1 nm (F-line: Alternate one long and one short dash lines), and 656.3 nm (C-line: Alternate one long and two short dash lines). As for astigmatism, the solid lines represent the sagittal image surfaces, and the dotted lines represent the meridional image surfaces. Incidentally, SA represents spherical aberration; AS represents astigmatism; DT represents distortion; CC represents chromatic aberration of magnification; FNO represents the F-number; FIY represents the height of the image.

The following shows the numbers of the conditional expressions (1) to (7) according to each of the above-described embodiments.

| Conditional Exp. | 1st Embodiment | 2nd Embodiment | 3rd Embodiment |
|---|---|---|---|
| (1) | 1.622 | 1.702 | 1.640 |
| (2) | 1.900 | 1.950 | 1.817 |
| (3) | 1.793 | 1.825 | 1.678 |
| (4) | 0.017 | — | — |
| (5) | 30.455 | 25.203 | 45.555 |
| (6) | 1.068 | 1.066 | 0.961 |
| (7) | 2.630 | 2.636 | 2.440 |

Figure 7:
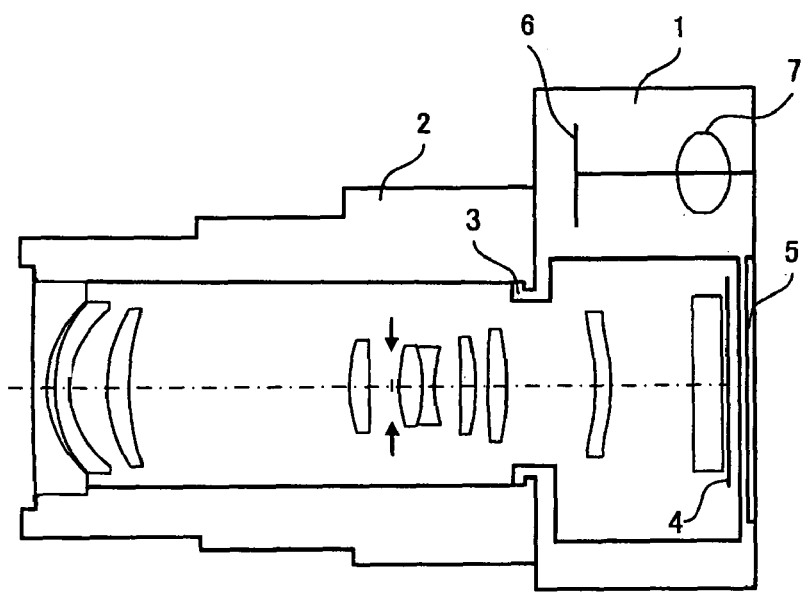
FIG. 7 is a cross-section view of a lens interchangeable-type camera that uses a wide angle zoom lens of the present invention as an interchangeable lens.

FIG. 7 is a cross-section view of a lens interchangeable-type camera that uses the wide angle zoom lens of the present invention and the small CCD, CMOS, or the like as image pickup element: The lens interchangeable-type camera serves as an electronic image pickup device. FIG. 7 illustrates the lens interchangeable-type camera 1, a picture-taking lens system 2 disposed in a lens barrel, a mounting section 3 of the lens barrel that allows the picture-taking lens system 2 to be mounted on or dismounted from the lens interchangeable-type camera 1, and uses a the screw-type or bayonet-type mount or other types of mount. In the example here, the bayonet-type mount is used. FIG. 7 also denotes an image pickup element plane 4, a back monitor 5, a finder image display element 6, and a finder optical system 7.

As the picture-taking lens system 2 of the lens interchangeable-type camera 1 having the above configuration, the wide angle zoom lens of the present invention described in the above first to third embodiments may be used.

According to the present invention described above, provided is the compact wide angle optical system that corrects, as an interchangeable lens suitable for lens interchangeable-type digital cameras, distortion to some extent; appropriately corrects various types of aberration, particularly chromatic aberration and field curvature; secures telecentricity; and has a fewer number of lenses.

Figure 8:
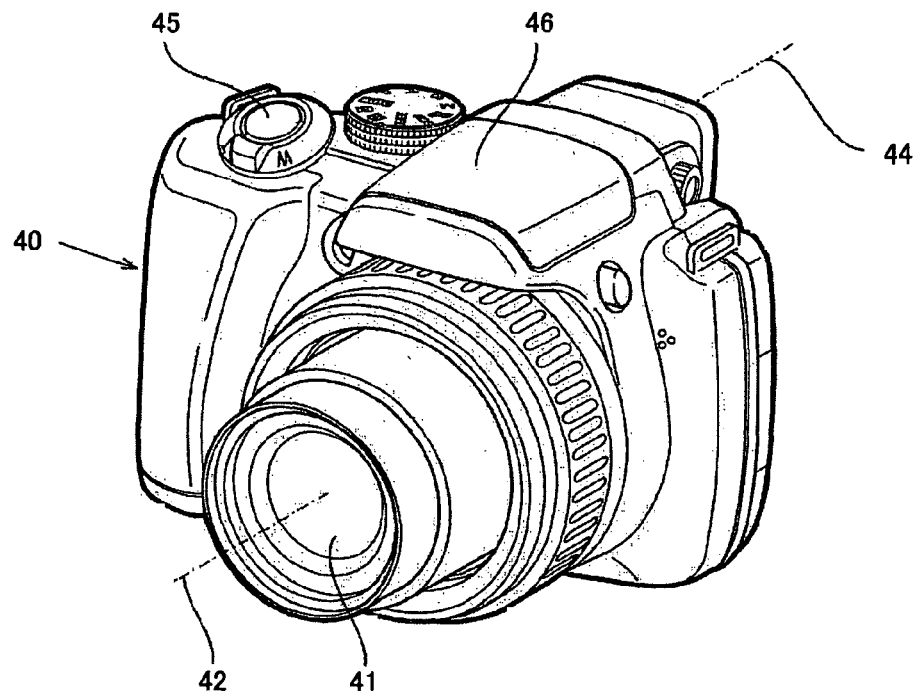
FIG. 8 is a front-side perspective view showing the exterior of a digital camera according to the present invention.
Figure 9:
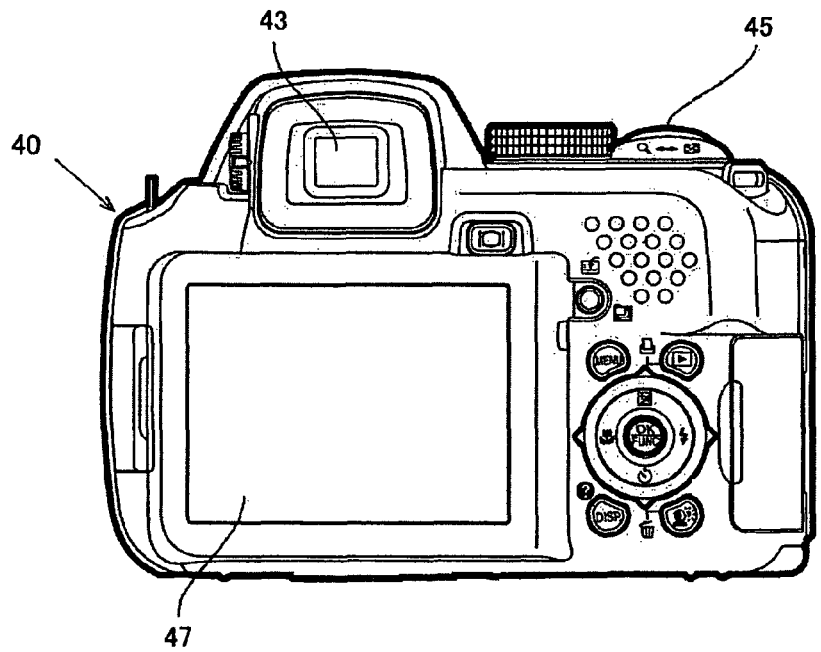
FIG. 9 is a rear view of the digital camera illustrated in FIG. 8.
Figure 10:
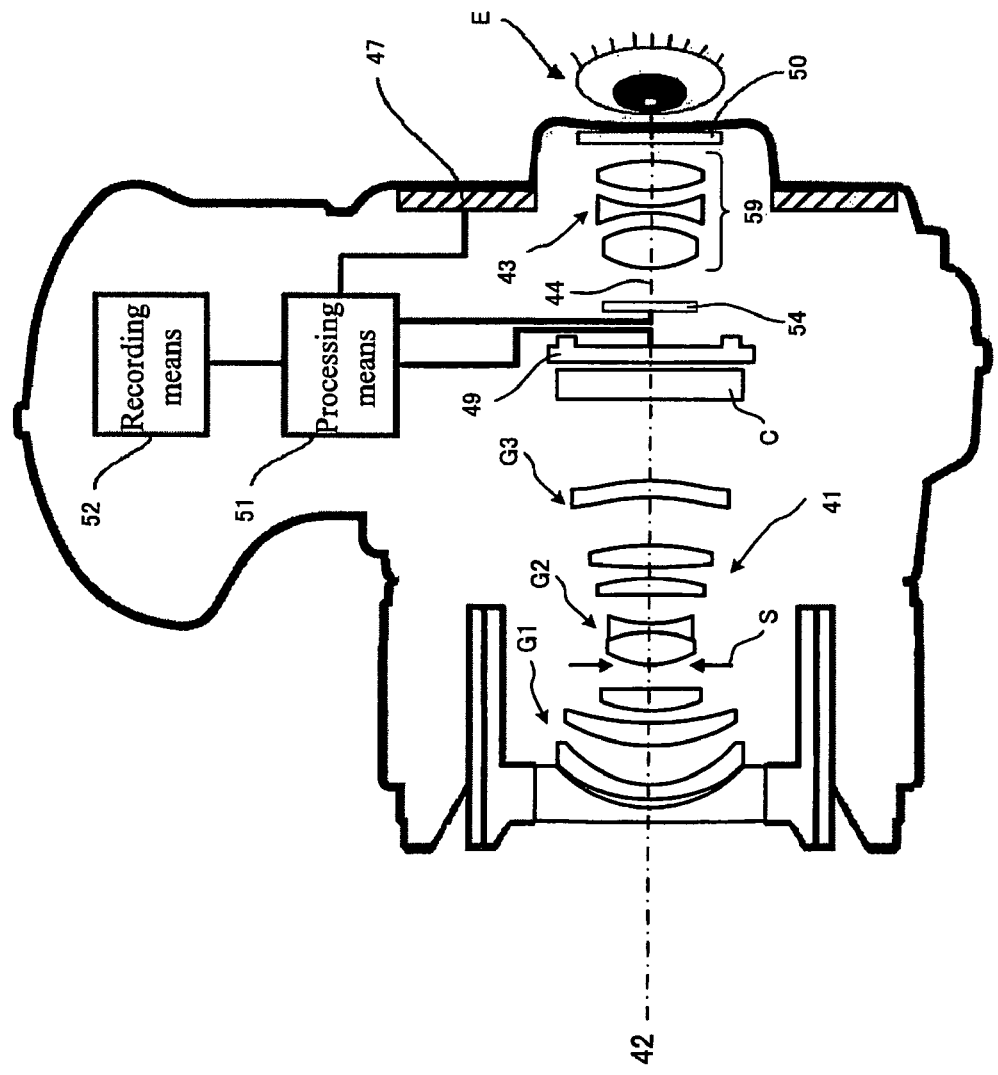
FIG. 10 is a transverse cross-section view of the digital camera illustrated in FIG. 8.

FIGS. 8 to 11 are schematic diagrams illustrating the configuration of an image pickup device in which the wide angle zoom lens is put in a picture-taking optical system 41, according to the present invention. FIG. 8 is a front-side perspective view showing the exterior of a digital camera 40. FIG. 9 is a rear view of the same. FIG. 10 is a schematic transverse cross-section view illustrating the configuration of the digital camera 40. Incidentally, FIGS. 8 and 10 illustrate a picture-taking state of the picture-taking optical system 41 (non-retracted state). FIG. 10 illustrates a non-picture-taking state of the picture-taking optical system 41 (retracted state).

In the example here, the digital camera 40 includes such components as the picture-taking optical system 41 disposed on a picture-taking optical path 42, a finder optical system 43 disposed on a finder optical path 44, a shutter button 45, a pop-up strobe 46, and a liquid crystal display monitor 47. When the shutter button 45 disposed on the upper side of the camera 40 is pressed, a picture is accordingly taken through the picture-taking optical system 41 including for example the lens of the first embodiment. The object image formed by the picture-taking optical system 41 is formed via a cover glass C on an image pickup plane (photoelectric conversion plane) of CCD 49 which is disposed near an imaging plane as image pickup element. The object image whose light is received by the CCD 49 is displayed as an electronic image through a processing means 51 on the liquid crystal display monitor 47 provided on the back of the camera or on a finder image display element 54. A recording means 52 may be connected to the processing means 51 to record the electronic image that the camera has taken.

When the non-picture-taking state comes after the image was taken, the picture-taking optical system 41 as a whole comes closer to the CCD 49 than to an infinite-distance focusing position and stops. Incidentally, in the non-picture-taking state, a space is provided in advance between the CCD 49 and the picture-taking optical system 41's lens that is closest to the image, so that the picture-taking optical system 41 as a whole can move along an optical axis to the CCD 49 rather than toward the infinite-distance focusing position. Even when the entire lens frame is retracted, the control area is secured at the side of the CCD 49.

Incidentally, the recording means 52 may be provided separately from the processing means 51 or may be formed by a flexible disc, a memory card, MO, or the like to electronically record and write. The camera may be formed as a silver salt camera in which the CCD 49 is replaced by a silver salt film.

Moreover, a finder eye lens 59 is disposed on the finder optical path 44. The object image displayed on the finder image display element 54 is enlarged and adjusted in visibility by the finder eye lens 59 so that a viewer can more easily watch. The object image is then led to a viewer's eyeball E. Incidentally, a cover member 50 is provided at the emission side of the finder eye lens 59.

Figure 11:
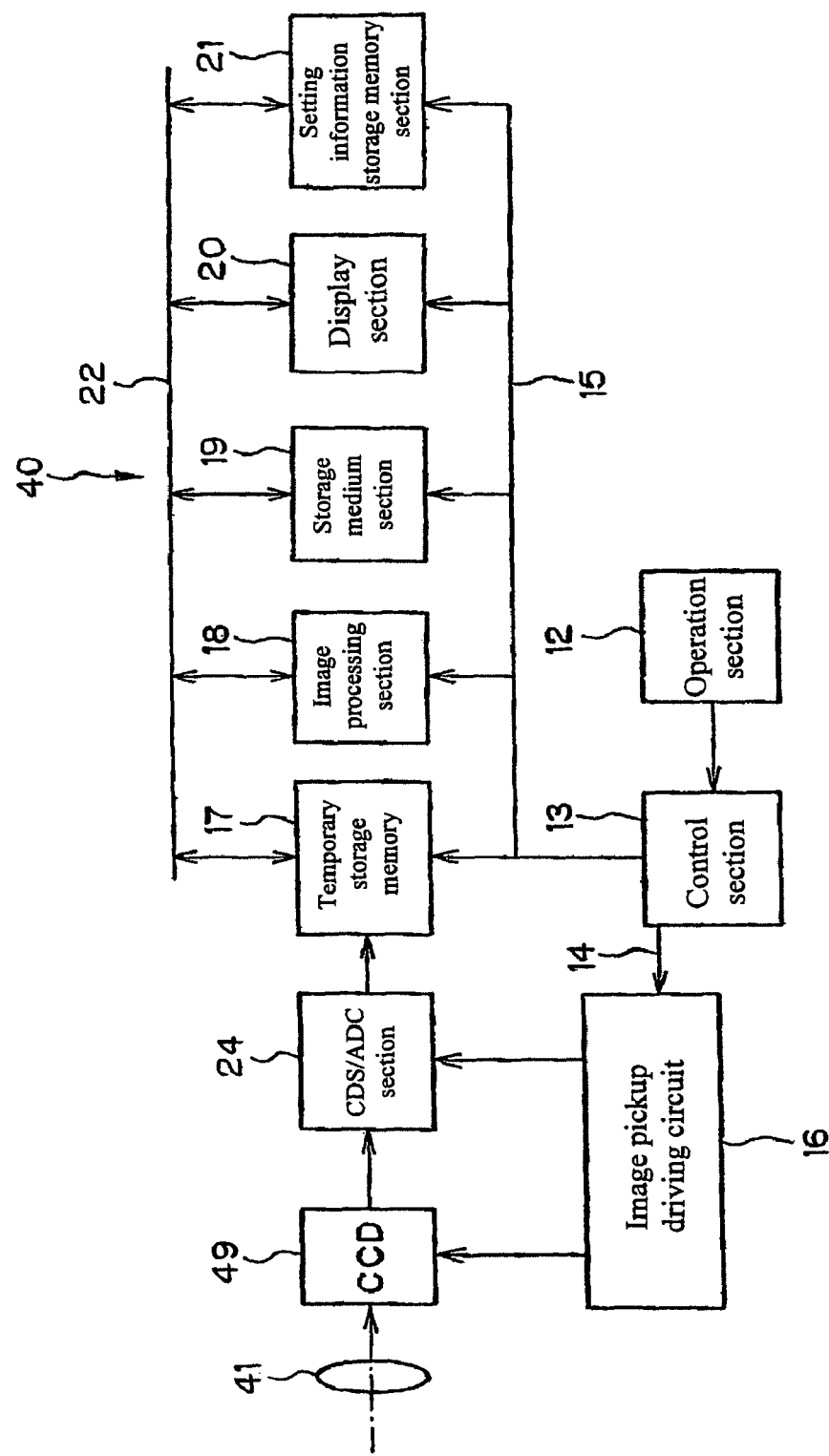
FIG. 11 is a block diagram illustrating the configuration of internal circuits of major sections of the digital camera illustrated in FIG. 8.

FIG. 11 is a block diagram illustrating the configuration of internal circuits of major sections of the above digital camera 40. In the description below, the above processing means 51 includes, for example, a CDS/ADC section 24, a temporary storage memory 17, an image processing section 18, and the like. The recording means 52 includes, for example, a storage medium section 19 and the like.

As shown in FIG. 11, the digital camera 40 is equipped with an operation section 12; a control section 13, which is connected to the operation section 12; an image pickup driving circuit 16 and the temporary storage memory 17, which are connected to the control signal output ports of the control section 13 via buses 14 and 15; the image processing section 18; the storage medium section 19; a display section 20; and a setting information storage memory section 21.

The above temporary storage memory 17, image processing section 18, storage medium section 19, display section 20, and setting information storage memory section 21 are so formed as to be able to input or output data to each other via a bus 22. The CCD 49 and the CDS/ADC section 24 are connected to the image pickup driving circuit 16.

The operation section 12 is equipped with various input buttons and switches and is a circuit that informs the control section about event information input from the outside (a camera user) through the input buttons and switches. The control section 13 is for example a central processing unit such as CPU, including a program memory (not shown). The control section 13 is a circuit that follows programs stored in the program memory to take overall control of the digital camera 40 in response to an instruction command input through the operation section 12 by the camera user.

The CCD 49 receives light of the object image formed through the picture-taking optical system 41 of the present invention. The CCD 49 is driven and controlled by the image pickup driving circuit 16. The CCD 49 is an image pickup element that converts the amount of light of the object image into electric signals on a per-pixel basis and outputs the electric signals to the CDS/ADC section 24.

The CDS/ADC section 24 is a circuit that amplifies the electric signals input from the CCD 49, performs analog-to-digital conversion, and outputs to the temporary memory 17 the video raw data (Bayer data; referred to as RAW data hereinafter) on which only amplification and digital conversion have been performed.

The temporary storage memory 17 is for example a buffer including SDRAM and the like and is a memory device that temporarily stores the RAW data output from the CDS/ADC section 24. The image processing section 18 is a circuit that reads out the RAW data stored in the temporary storage memory 17 or the RAW data stored in the storage medium section 19 and performs a variety of electrical image processes, including distortion aberration correction, on the basis of an image-quality parameter specified by the control section 13.

The storage medium section 19 is a control circuit of a device on or from which a card- or stick-type recording medium including a flash memory and the like can be for example mounted and dismounted. The storage medium section 19 records and retains in the card- or stick-type flash memory the RAW data transferred from the temporary storage memory 17 and the image data obtained by image processing of the image processing section 18.

The display section 20 is equipped with the liquid crystal display monitor 47 and the finder image display element 54 and is a circuit that displays images, operation menus, and the like on the liquid crystal display monitor 47 and the finder image display element 54. The setting information storage memory section 21 is equipped with a ROM section, in which various image-quality parameters are stored in advance, and a RAM section, which stores an image-quality parameter selected by the input operation of the operation section 12 from among the image-quality parameters read out from the ROM section. The setting information storage memory section 21 is a circuit that controls input to and output from the memories.

With the digital camera 40 having the above configuration, the present invention provides an image pickup device that can correct distortion to some extent, appropriately correct various kinds of aberration, particularly chromatic aberration and field curvature, and secure telecentricity while using a compact wide angle optical system that has a fewer number of lenses.

The present invention is applied not only to so-called compact digital cameras that take pictures of typical objects as described above but to surveillance cameras or the like that require wide angles of view.

What is claimed is:

1. A wide angle zoom lens, comprising, from an object side in the following order:

a first lens group that has a negative refractive power;

a second lens group that has a positive refractive power; and a third lens group, wherein the total number of lens groups in the wide angle zoom lens is three;

the first and second lens groups move while the third lens group remains fixed when variable magnification is carried out from a wide angle end to a telephoto end, so that an air space between the first lens group and the second lens group becomes narrow and that a space between the second lens group and the third lens group becomes wide;

the first and second lens groups each include at least positive and negative lenses;

the third lens group includes one meniscus lens whose convex surface faces an image surface, wherein the total number of lens in the third lens group is one; and the following conditional expressions (1) and (2) are satisfied:

$$1.4 \leq |f1|/fw \leq 1.8 \quad (1); \text{ and}$$

$$1.7 \leq f2/fw \leq 2.1 \quad (2)$$

where f1 is a focal length of the first lens group of the wide angle zoom lens;

f2 is a focal length of the second lens group of the wide angle zoom lens; and fw is a focal length of the entire system at the wide angle end of the wide angle zoom lens.

2. The wide angle zoom lens according to claim 1, wherein the meniscus lens in the third lens group is the positive meniscus lens having a positive refractive power.

3. The wide angle zoom lens according to claim 1, wherein only the first lens group moves to the object side during focusing from a long distance object point to a short distance object point.

4. The wide angle zoom lens according to claim 1, wherein:
the second lens group comprises two positive lenses that are disposed closest to the image among the second lens group; and
the following conditional expression (3) is satisfied:

$$1.5 \leq f_{2rp}/fw \leq 2.0 \quad (3)$$

where $f_{2rp}$ is a total focal length of the two positive lenses that are disposed closest to the image among the second lens group.

5. The wide angle zoom lens according to claim 1, wherein the second lens group, comprises, from the object side in the following order:

a positive lens that has a convex surface facing the object;

an aperture diaphragm;

a cemented lens component having a negative refractive power and comprising a biconvex lens and a biconcave lens;

a positive lens; and a positive lens, all the lens surfaces of the second lens group being spherical.

6. The wide angle zoom lens according to claim 1, wherein the first lens group comprises at least one aspheric surface.

7. The wide angle zoom lens according to claim 6, wherein:
the first lens group comprises a plastic aspheric lens; and
the following conditional expression (4) is satisfied:

$$|\phi 12| \leq 0.04 \quad (4)$$

where $\phi 12$ is the refractive power of the plastic aspheric lens.

8. The wide angle zoom lens according to claim 6, wherein the first lens group comprises a hybrid aspheric lens including a glass lens and a resin layer applied to the surface of the glass lens, the surface of the resin layer being aspheric.

9. The wide angle zoom lens according to claim 6, wherein the first lens group comprises a aspheric glass lens.

10. The wide angle zoom lens according to claim 1, wherein
the meniscus lens in the third lens group has an aspheric surface whose refractive power gradually decreases away from an optical axis.

11. The wide angle zoom lens according to claim 1, wherein
the meniscus lens in the third lens group satisfies the following conditional expression (5):

$$20 \leq (L31f + L31r)/(L31f - L31r) \leq 50 \quad (5)$$

where L31f is the curvature radius of the object-side lens surface of the meniscus lens; and L31r is the curvature radius of the image-side lens surface of the meniscus lens.

12. The wide angle zoom lens according to claim 1, wherein
the following conditional expression (6) is satisfied:

$$0.8 \leq D_{t2-3}/ft \leq 1.2 \quad (6)$$

where $D_{t2-3}$ is an air space on an optical axis at the telephoto end between the lens surface that is closest to the image in the second lens group and the lens surface that is closest to the object in the third lens group; and ft is a focal length of the entire system at the telephoto end of the wide angle zoom lens.

13. The wide angle zoom lens according to claim 1, wherein
the following conditional expression (7) is satisfied:

$$1.0 \leq (SD1 + SD2 + SD3)/fw \leq 2.8 \quad (7)$$

where SD1 is the distance between the lens surface that is closest to the object and the lens surface that is closest to the image among the first lens group on an optical axis;

SD2 is the distance between the lens surface that is closest to the object and the lens surface that is closest to the image among the second lens group on an optical axis; and SD3 is the distance between the lens surface that is closest to the object and the lens surface that is closest to the image among the third lens group on an optical axis.

14. An image pickup device comprising:
the wide angle zoom lens claimed in claim 1; and
an image pickup element provided near an imaging plane of the wide angle zoom lens, wherein
at least one of the first, second and third lens groups is positioned in non-picture-taking state closer to the image pickup element than to the position of a picture-taking state between the wide angle end and the telephoto end.

15. The image pickup device according to claim 14, wherein
the first, second and third lens groups are positioned in the non-picture-taking state closer to the image pickup element than to the positions of the picture-taking state between the wide angle end and the telephoto end.

* * * * *